United States Patent
Okuyama

(10) Patent No.: US 7,415,277 B2
(45) Date of Patent: Aug. 19, 2008

(54) MOBILE COMMUNICATION SYSTEM, MOBILE COMMUNICATION METHOD, AND MOBILE STATION

(75) Inventor: Toshiyuki Okuyama, Tokyo (JP)

(73) Assignee: NEC Corporation (JP)

( * ) Notice: Subject to any disclaimer, the term of this patent is extended or adjusted under 35 U.S.C. 154(b) by 3 days.

(21) Appl. No.: 10/903,370

(22) Filed: Jul. 30, 2004

(65) Prior Publication Data
US 2005/0026617 A1 Feb. 3, 2005

(30) Foreign Application Priority Data
Jul. 30, 2003 (JP) ............................. 2003-282227

(51) Int. Cl.
*H04Q 7/20* (2006.01)
(52) U.S. Cl. ...................... 455/436; 455/437
(58) Field of Classification Search ................ 455/436, 455/437, 438, 439, 442, 444, 552.1, 550.1, 455/435.1, 435.2, 435.3
See application file for complete search history.

(56) References Cited

U.S. PATENT DOCUMENTS

| 6,597,911 | B1 | 7/2003 | Kransmo | |
| 2003/0054829 | A1* | 3/2003 | Moisio | 455/452 |
| 2004/0092281 | A1* | 5/2004 | Burchfiel | 455/522 |
| 2004/0116110 | A1* | 6/2004 | Amerga et al. | 455/422.1 |
| 2004/0219901 | A1* | 11/2004 | Loke | 455/318 |
| 2005/0059401 | A1* | 3/2005 | Chen et al. | 455/437 |

FOREIGN PATENT DOCUMENTS

| EP | 1 292 039 A2 | 3/2003 |
| GB | 2 328 582 | 2/1999 |
| GB | 2 358 550 | 7/2001 |
| WO | WO 02/11485 A2 | 2/2002 |

OTHER PUBLICATIONS

3GPP TS 25.301 v5.3.0 (Jun. 2003) pp. 18-24.
3GPP TS 25.301 v5.5.0 (Jun. 2003) pp. 408-412.

(Continued)

*Primary Examiner*—Melody Mehrpour
(74) *Attorney, Agent, or Firm*—Ostrolenk, Faber, Gerb & Soffen, LLP

(57) ABSTRACT

In a mobile communication system, a base station of a cell transmits neighboring cell information to a mobile station located in the cell. The mobile station monitors signals of neighboring cells based on the information. The neighboring cell information includes identification information on the cell in which the mobile station is located and on the neighboring cells thereof; and ranks for monitoring the respective cells. When a reception signal level of a signal transmitted by the base station of the cell in which the mobile station is located becomes equal to or below a given threshold value, the mobile station monitors a signal of a corresponding neighboring cell. The neighboring cell information may include specific reception signal levels for the respective neighboring cells instead of the ranks.

13 Claims, 7 Drawing Sheets

OTHER PUBLICATIONS

Untranslated Office Action issued by Chinese Patent Office on Jul. 21, 2006 in connection with corresponding Chinese Patent application No. 200410070214.2.

English translation of Chinese Office Action dated Jul. 21, 2006 submitted in lieu of Statement of Relevancy of the present invention to the teachings of the cited prior art.

Search Report issued by European Patent Office on Feb. 21, 2008 in connection with corresponding European patent application No. EP 04 01 8115.

"3GPP TS 25.331 V5.5.0 (Jun. 2003)" [Online] Jun. 2003 (Jun. 2003), XP002468113 Retrieved from the Internet: URL:http://www.3gpp.org/ftp/Specs/html-inf o/25331.htm> [retrieved on Feb. 7, 2008]* p. 408 - p. 412 *.

"3GPP TS 25.304 V5.3.0 (Jun. 2003)" [Online] Jun. 2003 (Jun. 2003), XP002468114 Retrieved from the Internet: URL:http://www.3gpp.org/ftp/Specs/html-inf o/25304.htm> [retrieved on Feb. 7, 2008] * p. 18 - p. 24.

* cited by examiner

```
NEIGHBORING
CELL INFORMATION {
    { 101 },
    { 201 },
    { 202 },
    { 203 },
    { 204 },
    { 205 },
    { 206 },
    { 301 },
    { 302 },
}
```

Fig. 3

```
NEIGHBORING
CELL INFORMATION {
    { 101 , RANK  0 },
    { 201 , RANK  1 },
    { 202 , RANK  1 },
    { 203 , RANK  1 },
    { 204 , RANK  1 },
    { 205 , RANK  1 },
    { 206 , RANK  1 },
    { 301 , RANK  2 },
    { 302 , RANK  2 },
}
```

Fig. 4

```
NEIGHBORING
CELL INFORMATION {
    { 201,  RANK  0 },
    { 101,  RANK  1 },
    { 202,  RANK  1 },
    { 206,  RANK  1 },
    { 301,  RANK  1 },
    { 302,  RANK  1 },
    { 203,  RANK  2 },
    { 204,  RANK  2 },
    { 205,  RANK  2 },
}
```

Fig. 6

```
NEIGHBORING
CELL INFORMATION {
    { 101 ,  +20dB },
    { 201 ,  -10dB },
    { 202 ,  -10dB },
    { 203 ,  -10dB },
    { 204 ,  -10dB },
    { 205 ,  -10dB },
    { 206 ,  -10dB },
    { 301 ,  -20dB },
    { 302 ,  -20dB },
}
```

Fig. 7

MOBILE COMMUNICATION SYSTEM, MOBILE COMMUNICATION METHOD, AND MOBILE STATION

BACKGROUND OF THE INVENTION

1. Field of the Invention

The present invention relates to a mobile communication system, a mobile communication method, and a mobile communication terminal. More specifically, the present invention relates to a technique to monitor neighboring cells of a cell in which a mobile communication terminal (that is, a mobile station) is located.

2. Description of the Related Art

In a mobile communication system applying the Wideband Code Division Multiple Access (W-CDMA) technology, a mobile station always monitors reception levels of a currently located cell and neighboring cells thereof so as to execute handover and cell reselection. However, when the mobile station always monitors the neighboring cells, operation rate of the mobile station becomes higher and power consumption thereof increases. Accordingly, there is proposed a mobile communication system which does not monitor signals of neighboring cells when a reception signal level of a signal received from a base station of the cell in which the mobile station is currently located is sufficiently large. This system is described in 3GPP TS25.304 v5.3.0 (2003-06) pages 18-24 and in 3GPP TS 25.301 v5.5.0 (2003-06) pages 408-412, for example. However, when the mobile station moves at high speed, speed of a decline of the reception signal level is greater than an operation cycle for monitoring the neighboring cells. Cell reselection of the mobile station is delayed as a result. When the cell reselection is delayed, the mobile station cannot send and receive a call.

SUMMARY OF THE INVENTION

A mobile communication system according to the present invention includes a base station for informing a mobile station of neighboring cell information, and a mobile station for monitoring a signal of a neighboring cell based on the neighboring cell information. A mobile communication method according to the present invention includes the following steps of transmitting neighboring cell information from a cell base station to a mobile station located in a cell, causing the mobile station to monitor a reception signal level of a signal from the cell base station, and causing the mobile station to monitor a signal from a neighboring cell base station based on the neighboring cell information when the reception signal level becomes equal to or below a given threshold value. Moreover, a mobile station according to the present invention includes means for monitoring a reception signal level from a base station of a cell in which the mobile station is currently located, and means for monitoring a signal, of a neighboring cell when the reception signal level becomes equal to or below a given threshold value.

In the present invention described above, the mobile station monitors only a necessary signal of the neighboring cell in accordance with the neighboring cell information. Therefore, the mobile station does not waste electric power.

BRIEF DESCRIPTION OF THE DRAWINGS

The above and other objects, features and advantages of the present invention will become apparent from the following detailed description when taken with the accompanying drawings in which:

FIG. 3 shows an example of neighboring cell information;

FIG. 4 shows another example of the neighboring cell information;

FIG. 6 shows still another example of the neighboring cell information; and

FIG. 7 shows yet another example of the neighboring cell information.

DETAILED DESCRIPTION OF THE PREFERRED EMBODIMENT

Figure 1:
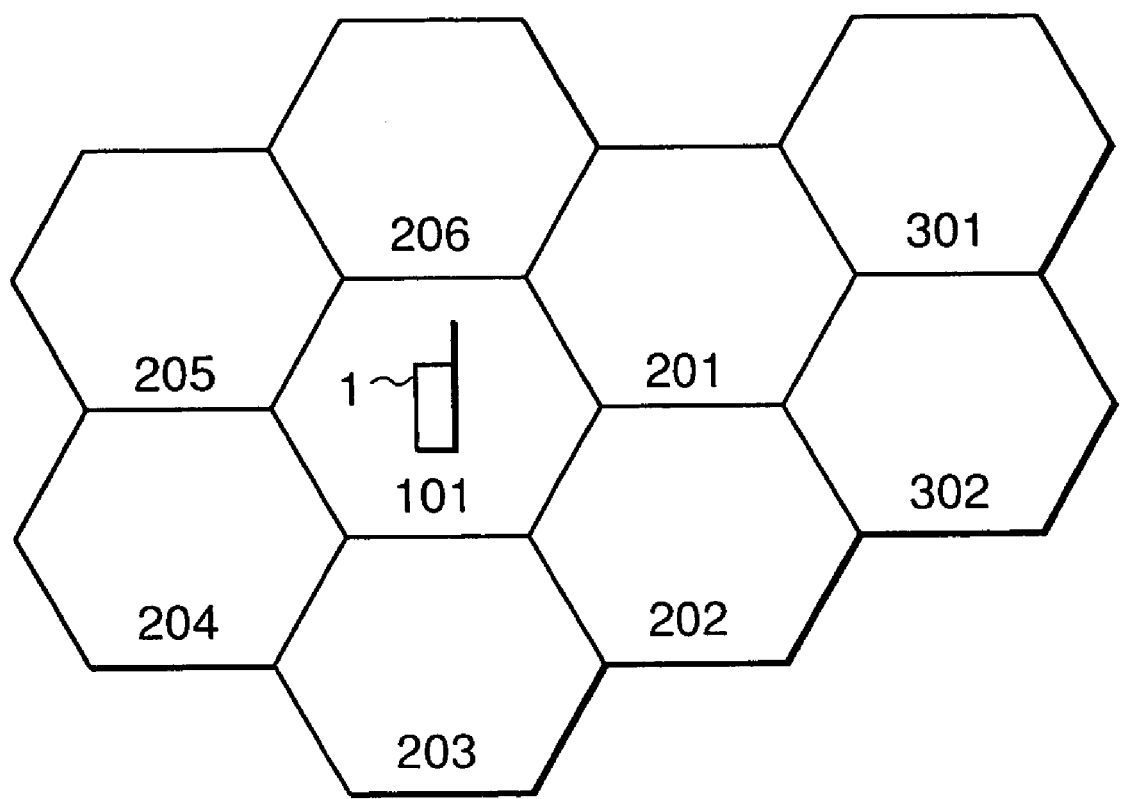
FIG. 1 shows a mobile communication system according to an embodiment of the present invention.

A preferred embodiment of the present invention will be described below. Referring to FIG. 1, a mobile communication system of the embodiment includes a plurality of cells 101, 201 to 206, 301, and 302. A mobile station 1 is located in the cell 101. Usually, a part of reachable range of radio waves of each cell overlaps a part of reachable range of radio waves of an adjacent cell. Each cell possesses a unique identification code (a scrambling code). In this embodiment, the cells 201 to 206, 301, and 302 are examples of neighboring cells for which the mobile station 1 monitors signals thereof. When the mobile station 1 enters the cell 101, a base station of the cell 101 transmits control information to the mobile station 1 and transmits broadcast information constantly. Either piece of the information includes neighboring cell information concerning the neighboring cells 201 to 206, 301, and 302 of the cell 101. For the respective cells, the neighboring cell information may include the identification codes, ranks (that is, priorities for monitoring signals of the neighboring cells), and reception signal level values as triggers for monitoring the respective cells. As described later, the mobile station 1 selects the neighboring cell to be monitored based on the neighboring cell information.

Figure 2:
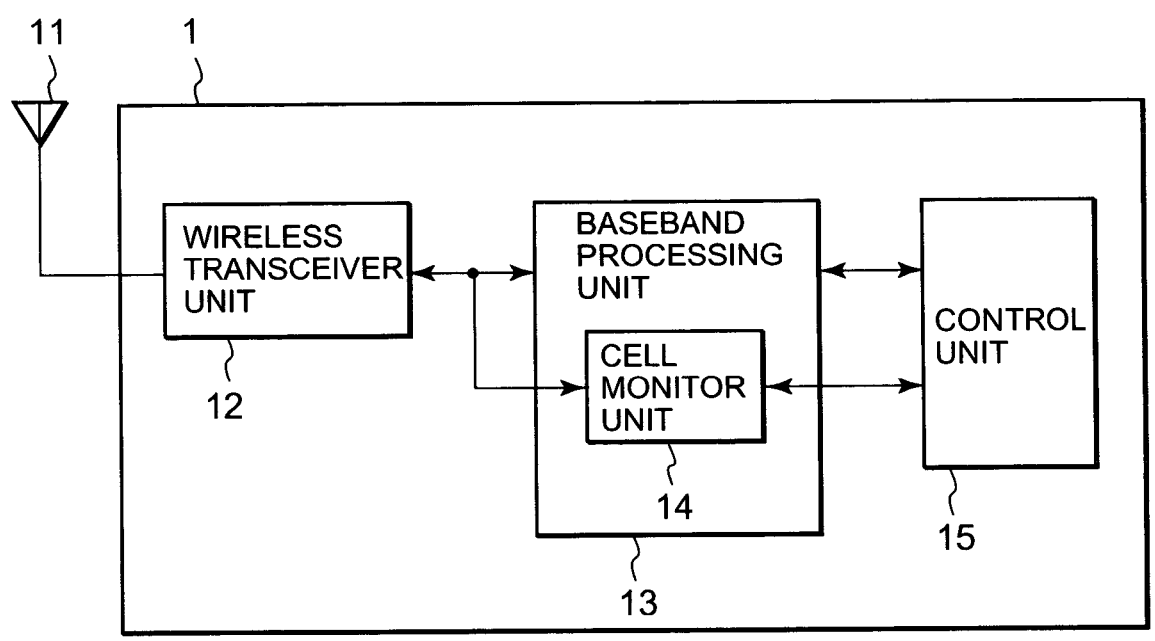
FIG. 2 is a block diagram showing a mobile station according to the embodiment of the present invention.

Referring to FIG. 2, the mobile station 1 of the embodiment includes an antenna 11, a wireless transceiver unit 12, a base band processing unit 13, and a control unit 15. The baseband processing unit 13 includes a cell monitor unit 14. Here, illustration of a display unit, a speaker, a microphone, and the like usually included in the mobile station 1 is omitted in FIG. 2. The antenna 11 receives a radio signal from the base station. The control unit 15 controls the baseband processing unit 13 and there by processes a base band signal. The cell monitor unit 14 selects an identification code designated by the control unit 15 from the received baseband signal. The cell monitor unit 14 also informs the control unit 15 of a reception signal level of the cell corresponding to the selected identification code. The control unit 15 can inform the base station of the selected cell and the reception signal level thereof.

FIG. 3 shows an example of the neighboring cell information. The neighboring cell information includes only the identification codes of the neighboring cells of the cell 101 (the identification codes are indicated as 101-302 in FIG. 3 and in other drawings to be described later). The mobile station 1 using this neighboring cell information always monitors signals of all the cells around the currently located cell 101. Accordingly, this mobile station 1 monitors signals of the neighboring cells which is unnecessary to be monitored and therefore wastes electric power.

Referring to FIG. 4, an example of the neighboring cell information used in the present invention is illustrated herein. The neighboring cell information includes the identification codes of the neighboring cells 201 to 206, 301, and 302 of the cell 101, and ranks for monitoring the respective neighboring cells. The rank "0" of the cell 101 in which the mobile station 1 is currently located is the highest rank. The mobile station 1 always monitors the reception level of the signal from the base station of the cell 101 while locating in the cell 101.

The rank "1" indicates the second highest rank. In this example, the cells 201 to 206 adjoining the cell 101 possess the rank "1". The neighboring cells 301 and 302 which are more remote from the cell 101 possess a lower rank "2".

Figure 5:
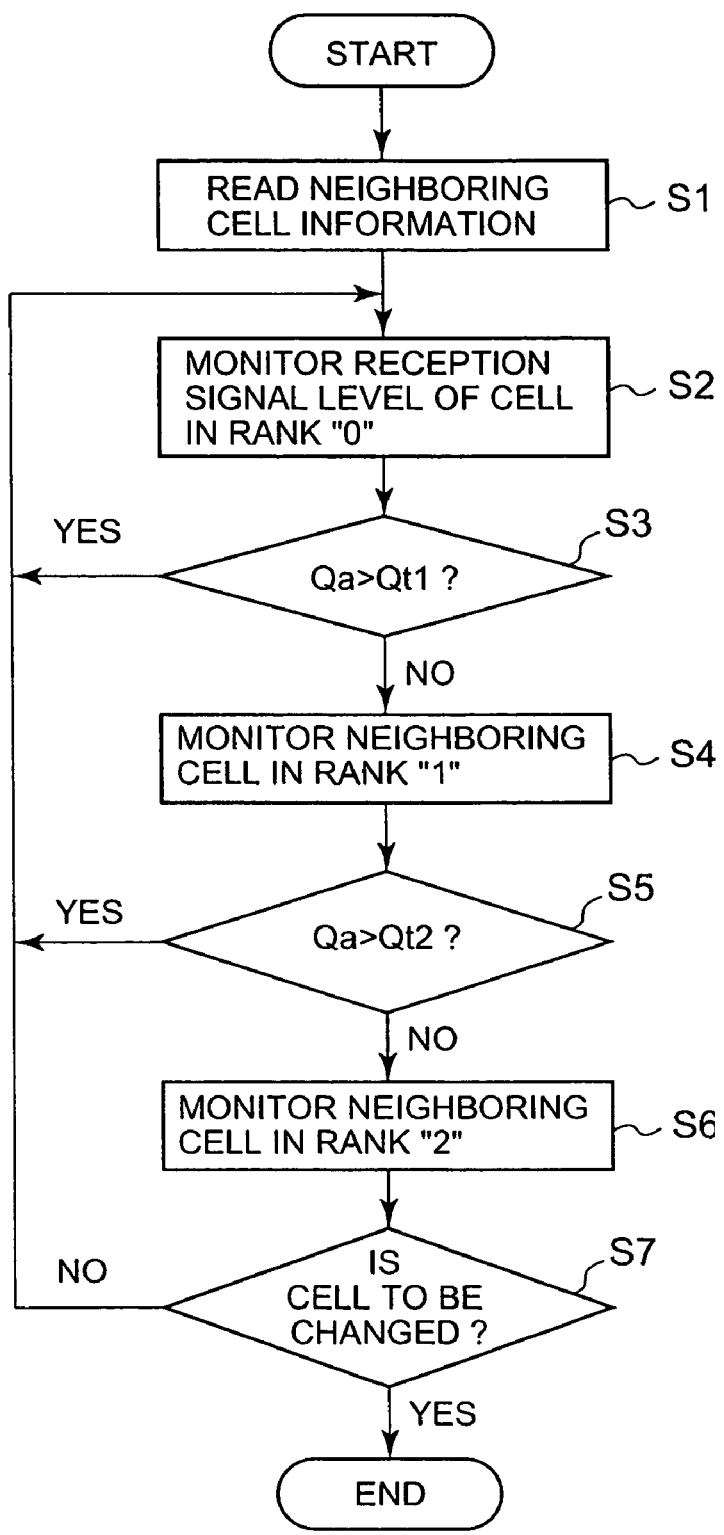
FIG. 5 is a flowchart showing an example of a mobile communication method of the present invention.

Referring to FIG. 5, an example of operations of the mobile communication system is illustrated herein. As shown in FIG. 1, the mobile station 1 is assumed to be located in the cell 101. The mobile station 1 receives the signal from the base station of the cell 101 and monitors the reception signal level (Qa) thereof. The mobile station 1 retains two threshold values Qt1 and Qt2 (Qt1>Qt2 in this example) corresponding to the above-described ranks. The threshold values can be inputted to the mobile station 1 in advance. Alternatively, the mobile station 1 can receive the threshold values from the base station after starting an operation. The mobile station 1 selectively detects the signals of the neighboring cells or the reception signal levels of the signals based on the threshold values.

The mobile station 1 receives the signal from the base station of the cell 101 and starts to monitor the reception signal level thereof. Simultaneously, the mobile station 1 reads the neighboring cell information (S1). Subsequently, the mobile station 1 monitors the reception signal level of the signal of the cell 101 which is in the highest rank, and retains the reception signal level Qa thereof (S2). The mobile station 1 determines whether or not the reception signal level Qa of the cell 101 is greater than the threshold value Qt1 (S3). When Qa is greater than Qt1 (YES in S3), the mobile station 1 only continues to monitor the reception signal level of the cell 101. When Qa is equal to or below Qt1 (NO in S3), the mobile station 1 starts to monitor the signals of the neighboring cells which possess the rank "1" (S4). Here, the neighboring cell information is assumed to be as shown in FIG. 4. At this time, the mobile station 1 starts to monitor the signals of the neighboring cells 201 to 206 (or the reception signal levels thereof) in addition to the cell 101. When Qa is equal to or below Qt1, the mobile station 1 continues to monitor the signals of the neighboring cells. Next, the mobile station 1 determines whether or not Qa is greater than Qt2 (S5). When Qa is greater than Qt2 (YES in S5), the above-described monitoring operation is executed again. When Qa is equal to or below Qt2 (NO in S5), the mobile station 1 starts to monitor the signals of the neighboring cells 301 and 302 which possess the rank "2" (S6). At this time, the mobile station 1 monitors the signals of the cells 101, 201 to 206, 301, and 302. Thereafter, the mobile station 1 determines whether or not the station 1 should change the cell 101 (S7). When the mobile station 1 remains in the current cell 101 (NO in S7), the above-described monitoring operation is continued again. When the mobile station 1 is controlled by a base station of a different cell instead of the cell 101 (YES in S7), the mobile station 1 executes the above-described operations in a new cell. For example, when the mobile station 1 is controlled by a base station of the cell 201, the base station of the cell 201 transmits neighboring cell information as shown in FIG. 6 to the mobile station 1. In this neighboring cell information, the cell 201 possesses the highest rank "0", the cells 101, 202, 206, 301, and 302 possess the rank "1", and the cells 203, 204, and 205 possess the rank "2". A condition for allowing the mobile station 1 to change the cell may be preset in the mobile station 1 or in the base station. One or more than two threshold values are available for monitoring the neighboring cells. The base station of the cell can transmit a control signal to modify the number of the threshold values Qt and level values which are set up in the mobile station 1.

Here, the reception signal level Qa of the cell may be set as a Signal to Interference Power Ratio (SIR) which represents a proportion of a target signal component of all electric power received by the mobile station 1, divided by the remaining interference signal component. Meanwhile, Qa may be any of Ec/No, Ec/Io, or Received Signal Code domain Power (RSCP). The target signal component is electric power of a channel of the cell where the mobile station 1 is located, and all the rest is the interference signal component. When the mobile station 1 is located close to the base station, electric power of the signal which the mobile station 1 receives from the base station is large, and electric power of the signal which the mobile station 1 receives from the neighboring cell is small. When the mobile station 1 is remote from the base station, electric power of the signal which the mobile station 1 receives from the neighboring cell becomes large.

Referring to FIG. 7, neighboring cell information of another example includes the identification codes of the neighboring cells 201 to 206, 301, and 302, and the threshold values of the reception signal levels corresponding to the respective cells. The cell 101 where the mobile station 1 is currently located is set at a threshold value "+20 dB". Meanwhile, the neighboring cells 201 to 206 are set at a threshold value "−10 dB" and the neighboring cells 301 and 302 are set at a threshold value "−20 dB", respectively. When the reception signal level of the signal which the mobile station 1 receives from the base station of the cell 101 becomes equal to or below the above threshold values, the mobile station 1 starts to monitor the signals of the neighboring cells (or the reception signal levels thereof) corresponding to the threshold values. For example, the signal which the mobile station 1 located in the cell 101 receives from the base station thereof does not usually exceed +20 dB. Accordingly, the mobile station 1 always monitors the reception signal level of the cell 101. When the reception signal level of the cell 101 becomes equal to or below −10 dB, the mobile station 1 starts to monitor the signals of the neighboring cells 201 to 206. Moreover, when the reception signal level of the cell 101 becomes equal to or below −20 dB, the mobile station 1 starts to monitor the reception signal levels of the neighboring cells 301 and 302. When the neighboring cell information shown in FIG. 7 is applied, the mobile station 1 does not have to store the threshold values like above-described Qt1 and Qt2.

In the above-described examples, the ranks or the threshold values in the neighboring cell information are set based on the layout of the neighboring cells. However, it is possible to set the ranks and the like so as to lead the mobile station 1 to a specified cell. For example, a cell capable of an operation such as High Speed Downlink Packet Access (HSDPA) or Multimedia Broadcast/Multicast Service (MBMS) is assumed to exist in the neighborhood. In this case, the base station transmits neighboring cell information with setting of a higher rank for the relevant cell to the mobile station. Moreover, the base station can transmit neighboring cell information with setting of a lower rank for a cell of which capacity is close to the limit, thus leading the mobile station to a cell having enough capacity.

While the present invention has been described in connection with a certain preferred embodiment, it is to be understood that the subject matter encompassed by the present invention is not limited to the specific embodiment. On the contrary, it is intended to include all alternatives, modifications, and equivalents as can be included within the spirit and scope of the following claims.

What is claimed is:

1. A mobile communication system comprising:
   a plurality of mobile communication cells including at least one first cell, at least one second neighboring cell located adjacently to the first cell and at least one third neighboring cell located adjacently to the second neighboring cell while being distanced from the first cell;
   a mobile station located in the first cell, the mobile station including a preset threshold of the third neighboring cell and a preset threshold of the second neighboring cell and receiving a second neighboring cell information and a third neighboring cell information, the threshold of the third neighboring cell being lower than the threshold of the second neighboring cell; and
   a base station located in the first cell and transmitting a first signal;
   wherein the mobile station monitors a reception level of the first signal while simultaneously reading the second neighboring cell information and the third neighboring cell information, wherein the mobile station monitors a signal from the second neighboring cell when the reception level of the first signal is equal to or falls below the threshold of the second neighboring cell, wherein the mobile station monitors a signal from the third neighboring cell when the reception level of the first signal is equal to or falls below the threshold of the third neighboring cell, and wherein said base station comprises a control signal operable to modify values of the threshold of the second neighboring cell and the threshold of the third neighboring cell preset on the mobile station.

2. The mobile communication system according to claim 1, wherein the second and third neighboring cell information includes:
   identification information on a cell in which the mobile station is located and on the neighboring cell thereof; and
   ranks for monitoring the respective cells.

3. The mobile communication system according to claim 2, wherein the ranks for monitoring the cells correspond to the reception level of the first signal received from the base station of the first cell in which the mobile station is located.

4. The mobile communication system according to claim 1, wherein the second and third neighboring cell information includes:
   identification information on the first cell in which the mobile station is located and on the second and third neighboring cells; and
   reception signal levels corresponding to the respective cells.

5. The mobile communication system according to claim 4, wherein the mobile station, when the reception level of the first signal transmitted from the base station of the first cell becomes equal to or falls below any of the reception signal levels included in the second and third neighboring cell information, monitors a signal of a neighboring cell corresponding to the level.

6. The mobile communication system according to claim 1, wherein the mobile communication system adopts a code division multiple access method.

7. A mobile communication method between a mobile station and a cell base station, the method comprising the steps of:
   presetting threshold levels corresponding to ranks of a plurality of neighboring cells on the mobile station
   transmitting a first signal and a neighboring cell information from the cell base station to the mobile station located in a cell, the neighboring cell information including the ranks of the plurality of neighboring cells, the ranks being dependent on a layout of the neighboring cells;
   causing the mobile station to monitor a reception signal level of the first signal from the cell base station;
   causing the mobile station to monitor a signal from a first neighboring cell base station of a neighboring cell having a highest rank when the reception signal level of the first signal becomes equal to or falls below a threshold level corresponding to the highest rank;
   causing the mobile station to monitor a signal from a second neighboring cell base station of a neighboring cell having a second highest rank when the reception signal level of the first signal becomes equal to or falls below a threshold level corresponding to the second highest rank, the threshold level corresponding to the second highest rank being lower than the threshold level corresponding to the highest rank; and
   causing the cell base station to send a control signal to the mobile station to modify values of the threshold level corresponding to the second highest rank and the threshold level corresponding to the highest rank preset on the mobile station.

8. The mobile communication method according to claim 7,
   wherein the neighboring cell information further includes:
   identification information on a cell in which the mobile station is located and on the neighboring cells.

9. The mobile communication method according to claim 7,
   wherein the neighboring cell information further includes:
   identification information on a cell in which the mobile station is located and on the neighboring cells; and
   reception signal levels of the neighboring cells, and
   wherein the mobile station, when the reception signal level of the first signal becomes equal to or falls below a particular reception signal level of a particular neighboring cell, monitors a signal of the particular neighboring cell.

10. A mobile communication system comprising:
    a plurality of mobile communication cells including at least one first cell, at least one second neighboring cell and at least one third neighboring cell, each of the plurality of mobile communication cells having a rank;
    a mobile station located in the first cell, the mobile station including a preset threshold of the third neighboring cell and a preset threshold of the second neighboring cell and receiving a second neighboring cell information and a third neighboring cell information, the second neighboring cell information including at least a rank of the second neighboring cell and the third neighboring cell information including at least a rank of the third neighboring cell, the rank of the second neighboring cell being higher than the rank of the third neighboring cell and the threshold of the third neighboring cell being lower than the threshold of the second neighboring cell; and
    a base station located in the first cell and transmitting a first signal;
    wherein the mobile station monitors a reception level of the first signal while simultaneously reading the second neighboring cell information and the third neighboring cell information, wherein the mobile station monitors a signal from the second neighboring cell when the reception level of the first signal becomes equal to or falls below the threshold of the second neighboring cell, wherein the mobile station monitors a signal from the third neighboring cell when the reception level of the first signal becomes equal to or falls below the threshold of the third neighboring cell, and wherein said base station comprises a control signal operable to modify values of the threshold of the second neighboring cell and the threshold of the third neighboring cell preset on the mobile station.

11. The mobile communication system according to claim 10,
wherein the second neighboring cell information further includes identification information on the second neighboring cell and wherein the third neighboring cell information further includes identification information on the third neighboring cell.

12. The mobile communication system according to claim 10,
wherein the rank of each of the plurality of mobile communication cells depends on the layout of the mobile communication cells.

13. The mobile station according to claim 10,
wherein the second neighboring cell information further includes a signal reception level of the second neighboring cell and wherein the third neighboring cell information further includes a signal reception level of the third neighboring cell,
wherein the mobile station monitors a signal of the second neighboring cell when the reception level of the first signal becomes equal to or falls below the signal reception level of the second neighboring cell, and
wherein the mobile station monitors a signal of the third neighboring cell when the reception level of the first signal becomes equal to or falls below the signal reception level of the third neighboring cell.

* * * * *